(12) United States Patent
Meyer et al.

(10) Patent No.: US 8,228,029 B2
(45) Date of Patent: Jul. 24, 2012

(54) POWER TOOL, BATTERY PACK, AND METHOD OF OPERATING THE SAME

(75) Inventors: Gary D. Meyer, Waukesha, WI (US); Michael W. Phillips, Milwaukee, WI (US); John S. Scott, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1152 days.

(21) Appl. No.: 12/035,894

(22) Filed: Feb. 22, 2008

(65) Prior Publication Data

US 2008/0207026 A1    Aug. 28, 2008

Related U.S. Application Data

(60) Provisional application No. 60/891,318, filed on Feb. 23, 2007.

(51) Int. Cl.
*H02J 7/00* (2006.01)
(52) U.S. Cl. .......................................... 320/114; 320/112
(58) Field of Classification Search .................. 320/112, 320/114; 439/160
See application file for complete search history.

(56) References Cited

U.S. PATENT DOCUMENTS

| | | | |
|---|---|---|---|
| 5,504,412 A | 4/1996 | Chan et al. | |
| 5,553,675 A | 9/1996 | Pitzen et al. | |
| 5,589,288 A | 12/1996 | Coulson et al. | |
| 5,663,011 A | 9/1997 | Bunyea et al. | |
| 5,671,815 A | 9/1997 | Kabatnik et al. | |
| 5,792,573 A | 8/1998 | Pitzen et al. | |
| 5,881,823 A | 3/1999 | Kabatnik et al. | |
| 6,057,608 A | 5/2000 | Bailey, Jr. et al. | |
| 6,168,881 B1 | 1/2001 | Fischer et al. | |
| 6,223,835 B1 | 5/2001 | Habedank et al. | |
| 6,304,058 B2 | 10/2001 | Watson et al. | |
| 6,308,378 B1 | 10/2001 | Mooty et al. | |
| 6,329,788 B1 | 12/2001 | Bailey, Jr. et al. | |
| 6,357,533 B1 | 3/2002 | Buchholz et al. | |
| 6,412,572 B2 | 7/2002 | Habedank et al. | |
| 6,515,451 B2 | 2/2003 | Watson et al. | |
| 6,653,815 B2 | 11/2003 | Watson et al. | |
| 6,729,413 B2 | 5/2004 | Turner et al. | |
| 6,955,549 B2 | 10/2005 | Brazell et al. | |
| 6,996,909 B1 | 2/2006 | Buck et al. | |
| 7,005,831 B2 | 2/2006 | Watson et al. | |
| 7,121,854 B2 | 10/2006 | Buck et al. | |
| 7,125,270 B2 | 10/2006 | Buck et al. | |
| 7,182,150 B2 | 2/2007 | Grossman | |
| 2003/0039880 A1 | 2/2003 | Turner et al. | |
| 2003/0201738 A1 | 10/2003 | Yamamoto | |
| 2004/0072064 A1 | 4/2004 | Turner et al. | |

(Continued)

*Primary Examiner* — Edward Tso
*Assistant Examiner* — Aaron Piggush
(74) *Attorney, Agent, or Firm* — Michael Best & Friedrich LLP (57) ABSTRACT

An electrical combination includes a power tool having a body, a motor supported by the body, a support portion, and a drive mechanism driven by the motor such that the drive mechanism is operable to drive a tool element. The electrical combination also includes a battery operable for coupling to the power tool via the support portion. The battery is electrically connectable with the motor to selectively supply power to the motor. A single latch is positioned on the support portion of the power tool. The single latch is moveable between a locked position to secure the battery to the power tool and an unlocked position to allow removal of the battery from the support portion of the power tool.

16 Claims, 5 Drawing Sheets

U.S. PATENT DOCUMENTS

| | | |
|---|---|---|
| 2004/0081882 A1 | 4/2004 | Ontl |
| 2004/0081883 A1 | 4/2004 | Mooty et al. |
| 2004/0197175 A1* | 10/2004 | Turner et al. ............ 414/416.09 |
| 2004/0242042 A1 | 12/2004 | Buck et al. |
| 2004/0242043 A1 | 12/2004 | Buck et al. |
| 2006/0055369 A1 | 3/2006 | Duesselberg |
| 2006/0055370 A1 | 3/2006 | Duesselberg |
| 2006/0199072 A1 | 9/2006 | Lui et al. |

* cited by examiner

POWER TOOL, BATTERY PACK, AND METHOD OF OPERATING THE SAME

RELATED APPLICATIONS

This application claims priority to U.S. Provisional Patent Application No. 60/891,318 filed on Feb. 23, 2007.

FIELD OF THE INVENTION

The present invention relates to power tools and battery packs, and, more particularly, to a latch for a battery pack.

SUMMARY

In some embodiments, the invention provides an electrical combination including a power tool and a battery pack. The power tool can include a housing, a hand grip, a motor, a spindle driven by the motor, and a first connecting configuration for receiving the battery pack.

The battery pack can be operable to supply electrical power to the motor and can include a second connecting configuration configured to engage the first connecting configuration. The power tool can also or alternatively include a locking assembly for locking the battery pack to the power tool. The locking assembly can include a movable locking member supported in the housing and a movable actuator supported in the housing for moving the locking member between locked and unlocked positions.

In one embodiment, the invention provides an electrical combination including a power tool having a body, a motor supported by the body, a support portion, and a drive mechanism driven by the motor. The drive mechanism is operable to drive a tool element. The electrical combination also includes a battery operable for coupling to the power tool via the support portion and being electrically connectable with the motor such that the battery selectively supplies power to the motor. A single latch is positioned on the support portion of the power tool. The single latch is moveable between a locked position to secure the battery to the power tool and an unlocked position to allow removal of the battery from the support portion of the power tool.

In another embodiment, the invention provides a power tool including a motor, a drive mechanism driven by the motor to drive a tool element, and a body supporting the motor and the drive mechanism and having a grip surface and a connecting configuration for supporting a removeable battery. The connecting configuration supports a single latch moveable between a locked position and an unlocked position relative to the connecting configuration to allow locking and removal of the battery to and from the connecting configuration.

In another embodiment, the invention provides a method of operating a power tool including a motor, a drive mechanism driven by the motor to drive a tool element, and a body supporting the motor and the drive mechanism and having a grip surface and a connecting configuration for supporting a removeable battery, the connecting configuration supporting a single latch moveable between a locked position and an unlocked position relative to the connecting configuration. The method includes the act of moving the single latch from the locking position toward the unlocking position with a single finger of an operator's hand such that the other fingers of the operator's hand can grip the battery to remove the battery from the connecting configuration.

In another embodiment, the invention provides a method of manufacturing a power tool designed to operate upon engagement with a removable battery. The method includes the acts of providing a motor, coupling a drive mechanism to the motor for driving a tool element, and providing a body designed to support the motor and the drive mechanism. The body has a grip surface and a connecting configuration for supporting the battery. The connecting configuration includes a single latch moveable between a locked position and an unlocked position relative to the connecting configuration to allow locking and removal of the battery to and from the connecting configuration.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first" and "second" are used herein for purposes of description and are not intended to indicate or imply relative importance or significance.

FIGS. 1-6 illustrate an electrical combination 10. The electrical combination 10 can include a power tool 12 (partially shown in FIGS. 1-3), such as, for example, a drill, a hammer drill, or an impact wrench, and a battery pack 14. In other embodiments, the power tool 12 can be another hand-held power tool, such as, for example, a reciprocating saw, a router, a drill, a screwdriver, a grinder, a sander, a circular saw, a band saw, or another handheld power tool.

Figure 1:
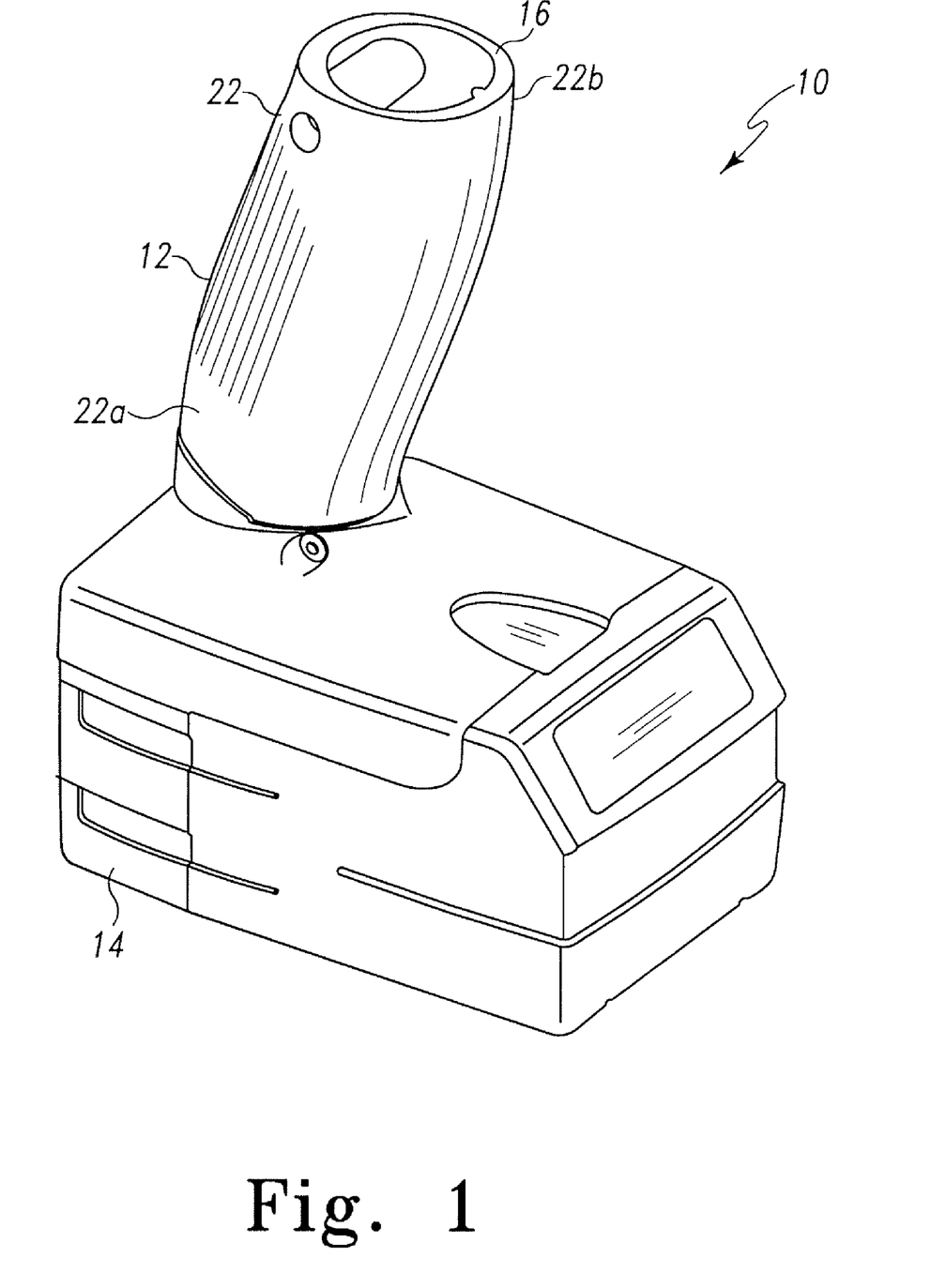
FIG. 1 is a perspective view of a battery pack and a portion of a power tool according to some embodiments of the present invention.
Figure 2:
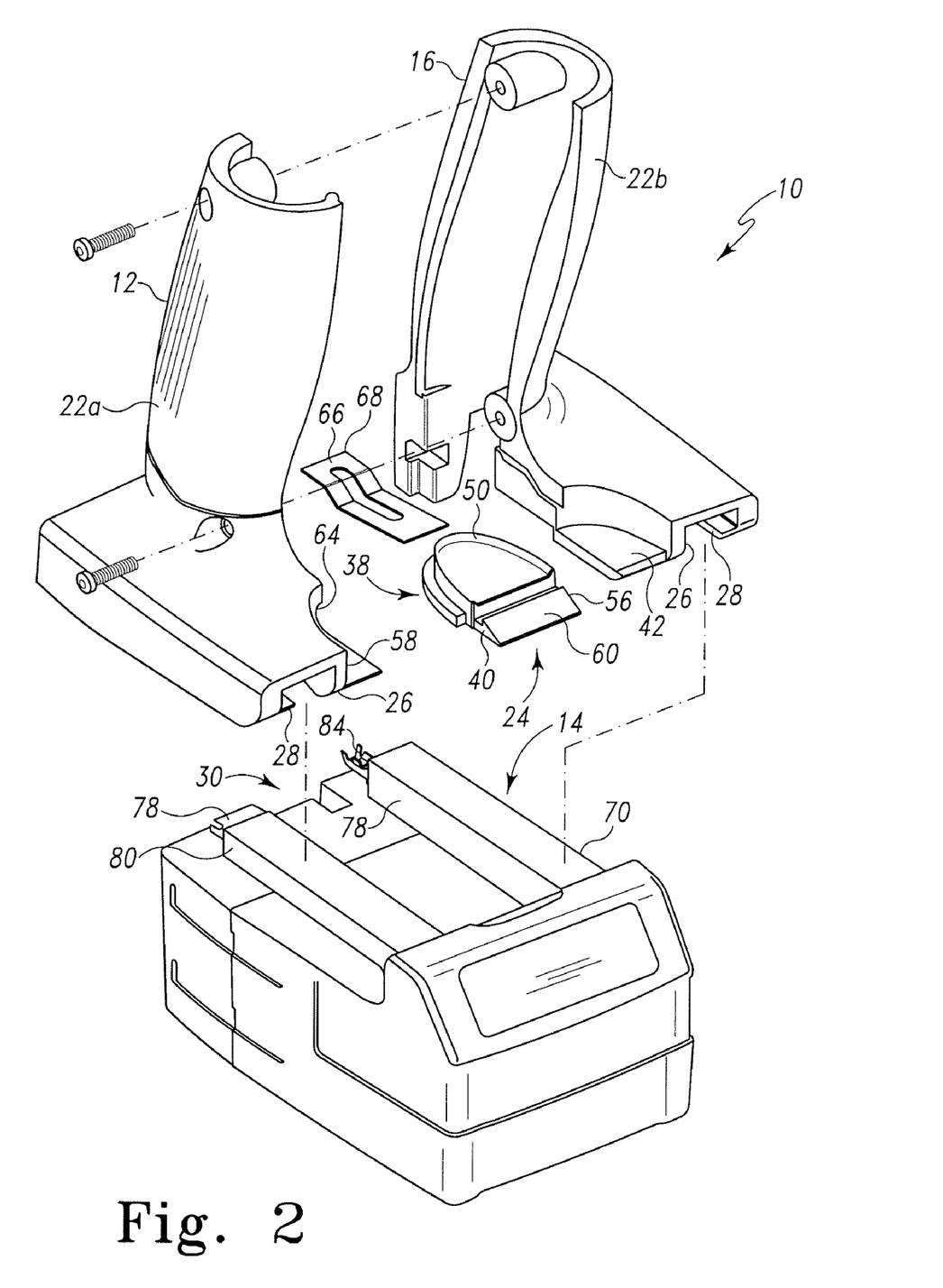
FIG. 2 is an exploded perspective view of the battery pack and the portion of the power tool shown in FIG. 1.
Figure 3:
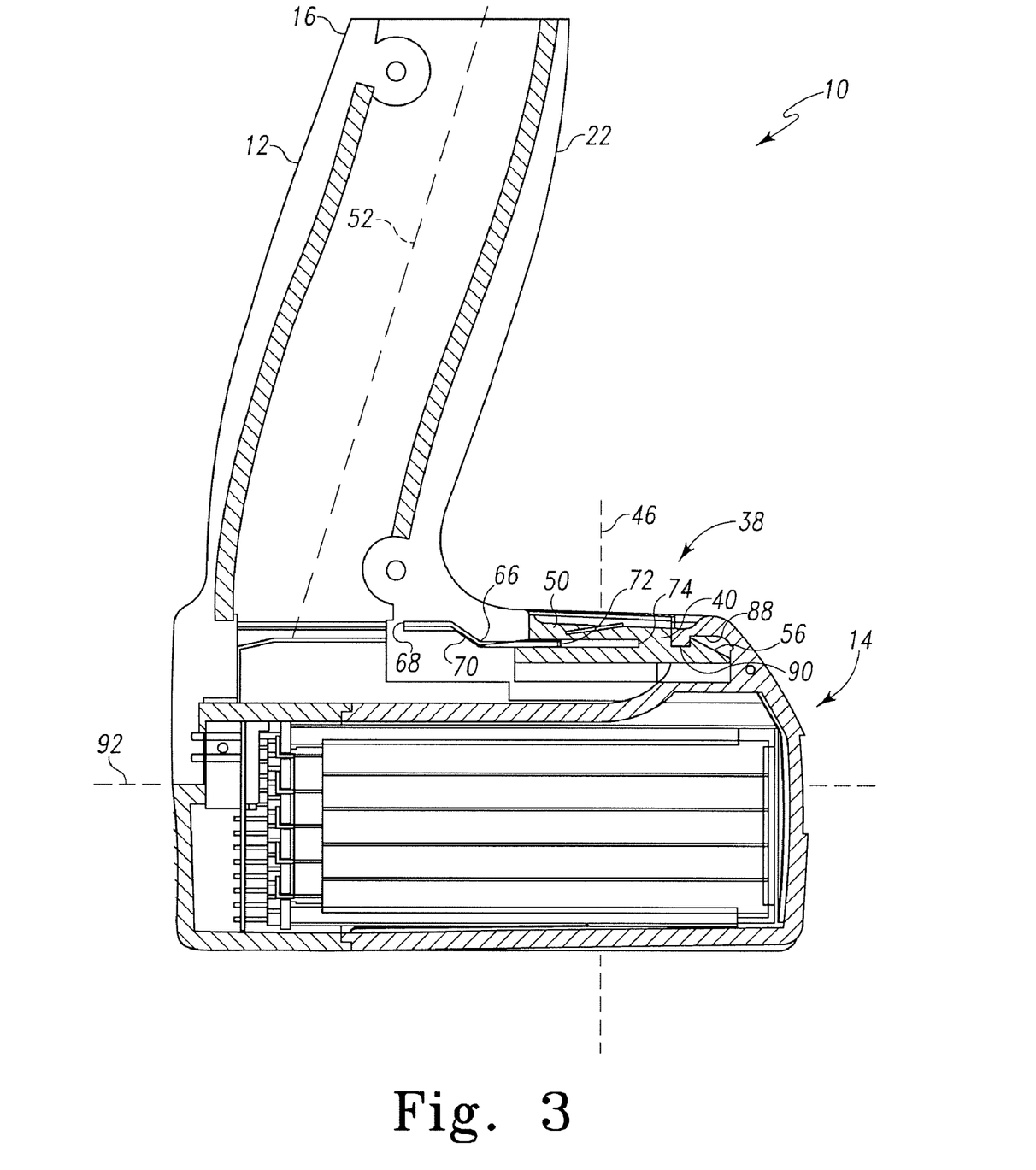
FIG. 3 is a cross-sectional view of the battery pack and the portion of the power tool shown in FIG. 1.
Figures 4, 5:
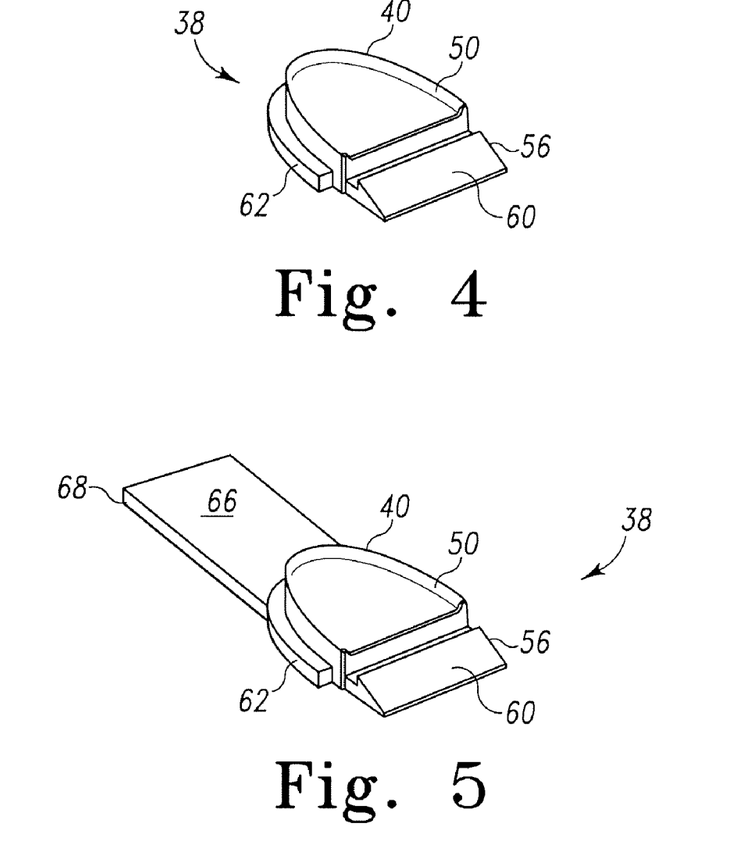
FIG. 4 is an enlarged perspective view of a portion of a latching configuration of the power tool shown in FIG. 1.
FIG. 5 is an enlarged perspective view of the portion of the latching configuration shown in FIG. 4 in a locked position.
Figure 6:
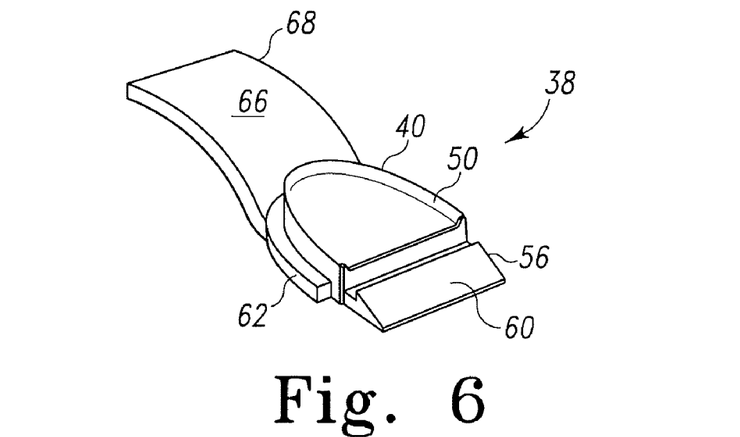
FIG. 6 is an enlarged perspective view of the portion of the latching configuration shown in FIG. 4 in an unlocked position.

The power tool 12 includes a housing assembly 16 having a main operator's handle portion or hand grip 22. The housing assembly 16 houses a drive mechanism, a motor, and a spindle. Together, the drive mechanism, the motor, and the spindle are operable to rotate a tool element (not shown) generally about a tool axis for working on a workpiece (also not shown). In other embodiments, the drive mechanism, the motor, and the spindle can also or alternatively reciprocate the tool element along the tool axis for working on a workpiece.

In the illustrated embodiment of FIGS. 1-6, the hand grip 22 is formed of two grip halves 22a and 22b, which together at least partially define a support portion or connecting configuration 24 for removably supporting the battery pack 14 below the hand grip 22. In other embodiments, the hand grip 22 can be formed as a single integral member, or alternatively, can be formed from three or more interconnected members. Alternatively or in addition, the connecting configuration 24 and the elements of the connecting configuration 24 can have other positions and orientations with respect to the hand grip 22. For example, the connecting configuration 24 can be located on a rearward surface of the hand grip 22. In other embodiments, the connecting configuration 24 can be located on other portions of the power tool 12, such as, for example, on an upper surface, a side surface, or a forward surface of the power tool 12.

As shown in FIGS. 1-6, the connecting configuration 24 can include grooves 26 and projections 28, both of which can be operable to engage a connecting configuration 30 of the battery pack 14. In the illustrated embodiment of FIGS. 1-6, grooves 26 extend horizontally along a lower portion of the connecting configuration 24 and the projections 28 extend horizontally along the lower portion of the connecting configuration 24 and inwardly into the grooves 26 to define guide rails for matingly engaging corresponding guide rails 78 on the battery pack 14. In other embodiments, the connecting configuration 24 can include other grooves 26 and/or other projections 28 having the same or different orientations and configurations.

The connecting configuration 24 of the power tool 12 can also include a terminal assembly positioned between forward ends of the grooves 26 and projections 28 and electrically connected to an electrical circuit, which extends through the power tool 12 and is electrically connected to the motor. In other embodiments, the terminal assembly or a portion of the terminal assembly can be positioned in the projections 28.

The connecting configuration 24 of the power tool 12 can also or alternatively include a latching assembly 38 for locking the battery pack 14 to the power tool 12. In the illustrated embodiment, the latching assembly 38 can include a locking member 40 supported in a recess 42 defined between the grip halves 22a, 22b. As shown in FIG. 2, the recess 42 opens toward a forward end of the power tool 12. During operation and as explained in greater detail below, the locking member 40 is movable relative to the power tool 12 axially through the recess 42 along a locking axis 46 (see FIG. 3), which is generally perpendicular to a battery insertion axis 48 defined by the grooves 26 and projections 28 of the power tool 12.

As best shown in FIG. 1-6, the locking member 40 can include an actuator 50 formed on an upper surface and extending outwardly from the recess 42 for engagement by an operator's finger or thumb. In the illustrated embodiment, the actuator 50 is positioned between the grip halves 22a, 22b and is also aligned with a grip axis 52. In some such embodiments, the actuator 50 and the locking member 40 are moveable in a direction substantially parallel to a connecting plane defined between the handle halves 22a, 22b. In other embodiments, the actuator 50 can have other orientations and locations.

In some embodiments, such as the illustrated embodiment of FIGS. 1-6, the locking member 40 includes a locking projection 56, which is engageable with the connecting configuration 30 of the battery pack 14 to secure the battery pack 14 to the power tool 12. As shown in FIGS. 1-6, the locking projection 56 extends outwardly from the recess 42 through a forward opening 58 defined between the handle halves 22a, 22b and includes a sloped forward surface 60. In other embodiments, the locking projection 56 can have other orientations and locations.

As shown in FIGS. 1-6, the locking member 40 can also include an outwardly extending rib 62, which is engageable with a corresponding rib 64 extending outwardly from the handle halves 22a, 22b and extending around at least a portion of the perimeter of the recess 42. The engagement between the rib 62 of the locking member 40 and the rib 64 of the handle halves 22a, 22b maintains the locking member 40 in the locking recess 42.

In some embodiments, such as the illustrated embodiment of FIGS. 1-6, the connecting configuration 24 of the power tool 12 can include a biasing or elastic member 66. As shown in FIG. 1-6, the elastic member 66 can be a leaf spring having a rearward end 68 supported in a recess 70 defined in one or both of the handle halves 22a, 22b and a forward end 72 extending into an opening 74 defined in a rearward end of the locking member 40. In this manner, the elastic member 66 can bias the locking member 40 and the locking projection 56 upwardly toward a locked position.

In other embodiments, the connecting configuration 24 can include one or more other elastic members 66, such as, for example, coil springs, other leaf springs, and other resilient and/or deformable bodies. Alternatively or in addition, the elastic member 66 or a portion of the elastic member 66 can be positioned under the locking member 40 or to one side of the locking member 40 and/or can be integrally formed with the locking member 40.

As shown in FIGS. 1-6, the connecting configuration 30 of the battery pack 14 can include outwardly extending guide rails 78 extending horizontally along an upper surface of the battery pack 14 and protrusions 80 formed along and extending outwardly along exterior sides of the guide rails 78. The guide rails 78 and the protrusions 80 are operable to inter-engage with the grooves 26 and projections 28 on the connecting configuration 24 of the housing assembly 16 to removably support the battery pack 14 on the power tool 12. In other embodiments, the guide rails 78 and the protrusions 80 can have other relative positions and orientations within the connecting configuration 30 of the battery pack 14.

The connecting configuration 30 can also include a terminal assembly 84, which can be electrically connected to the terminal assembly 34 of the power tool 12 to supply electrical power to the electrical circuit of the power tool. In some embodiments, the terminal assembly 84 can be positioned on an upper surface of the battery pack 14 between forward ends of the guide rails 78. In other embodiments, the terminal assembly 84 or a portion of the terminal assembly can be supported in the guide rails 78 of the battery pack 14. In these embodiments, at least a portion of the terminal assembly 34 of the power tool 12 can be supported in the projections 28 of the power tool 12 for engagement with the terminal assembly 84 or the portion of the terminal assembly 84 supported in the battery pack 14.

The connecting configuration 30 of the battery pack 14 can also include a locking recess 88 formed in a forward portion of the battery pack 14 between the guide rails 78. In the illustrated embodiment of FIGS. 1-6, the locking recess 88 opens rearwardly (i.e., toward a rear end of the battery pack 14). As shown in FIG. 3, the connecting configuration 30 of the battery pack 14 can also include a locking rib 90 extending outwardly into the locking recess 88 for engagement with the locking projection 56 of the locking member 40.

In operation, the battery pack 14 is aligned with the power tool along a connection axis 92 so that the guide rails 78 and the protrusions 80 of the battery pack 14 are aligned with the projections 28 and grooves 30 of the power tool 12. The battery pack 14 is then moved rearwardly along the connecting axis 92 to interconnect the guide rails 78 and the protrusions 80 of the battery pack 14 and the projections 28 and grooves 30 of the power tool 12. As the battery pack 14 is moved onto the connecting configuration 24 of the power tool 12, the terminal assembly of the power tool 12 is electrically connected to the terminal assembly 84 of the battery pack 14.

Alternatively or in addition, as the battery pack 14 is moved rearwardly along the connecting axis 92, the sloped forward surface 60 of the locking projection 56 engages the locking rib 90, causing the locking projection 56 to move downwardly along the locking axis 46 toward an unlocked position and to compress the elastic member 66. As the battery pack 14 continues to move rearwardly along the connecting axis 92, the forward surface 60 of the locking projection 56 moves past the locking rib 90 and the locking projection 56 lockingly engages a forward edge of the locking rib 90, securing the battery pack 14 to the power tool 12.

To remove the battery pack 14 from the power tool 12, an operator grips the hand grip 22 with a first hand and grips a forward end of the battery pack 14 with a second hand. With the second hand, the operator also contacts the actuator 50 and moves the actuator 50 and the locking projection 56 downwardly along the locking axis 46 toward an unlocked position, in which the locking projection 56 is moved out of engagement with the locking rib 90 of the battery pack 14. The operator can then slide the battery pack 14 along the guide rails 78 and away from the power tool 12. Alternatively, the operator can remove the battery pack 14 from the power tool 12 with a single hand. In these embodiments, the operator grips opposite sides of the battery pack 14 with a thumb and the second an/or third fingers of one hand. The operator can then depress the actuator 50 with the index finger of the same hand. Because the actuator is positioned in a central position on the power tool 12, the operator can easily operate the actuator 50 with either hand while gripping the power tool 12 with the other hand.

Figure 7:
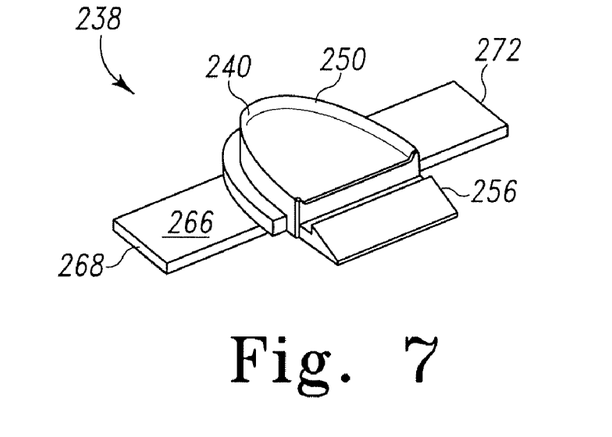
FIG. 7 is an enlarged perspective view of a portion of a latching configuration of s power tool according to an alternative embodiment of the present invention and with the connecting configuration in a locked position.
Figure 8:
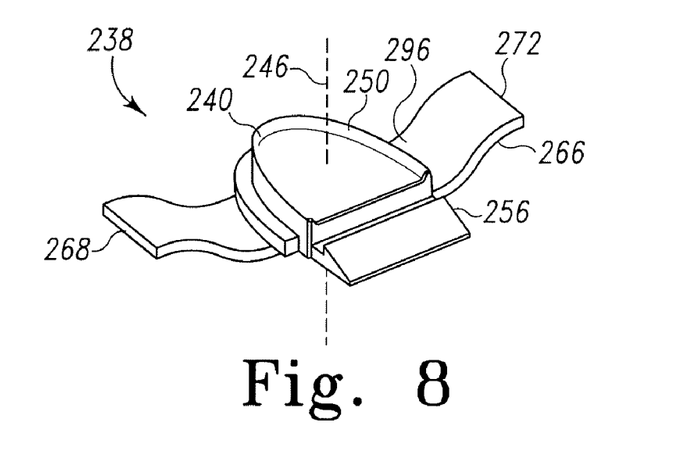
FIG. 8 is an enlarged perspective view of the portion of the latching configuration shown in FIG. 7 in an unlocked position.

FIGS. 7 and 8 illustrate another embodiment of a latching assembly 238 of a power tool. The latching assembly 238 shown in FIGS. 7 and 8 is similar in many ways to the illustrated embodiments of FIGS. 1-6 described above. Accordingly, with the exception of mutually inconsistent features and elements between the embodiment of FIGS. 7 and 8 and the embodiments of FIGS. 1-6, reference is hereby made to the description above accompanying the embodiments of FIGS. 1-6 for a more complete description of the features and elements (and the alternatives to the features and elements) of the embodiment of FIGS. 7 and 8. Features and elements in the embodiment of FIGS. 7 and 8 corresponding to features and elements in the embodiments of FIGS. 1-6 are numbered in the 200 series.

The latching assembly 238 can include a locking member 240 supported in a recess defined between the grip halves 22a, 22b of the power tool 12. As shown in FIGS. 7 and 8, the locking member 240 can include an actuator 250 formed on an upper surface for engagement by an operator's finger or thumb and an outwardly extending locking protrusion 256, which is engageable with the connecting configuration 30 of the battery pack 14 to secure the battery pack 14 to the power tool 12.

As shown in FIGS. 7 and 8, the latching assembly 238 can also include an elastic member 266 having a left side 286 engageable in a first recess defined between the first and second handle halves 22a, 22b of the power tool 12, a right side 272 engageable in a second recess defined between the first and second handle halves 22a, 22b of the power tool 12, and a central portion 296 positioned between the left and rights sides 266, 272 and moveable axially along locking axis 246 with the locking member 240.

Figure 9:
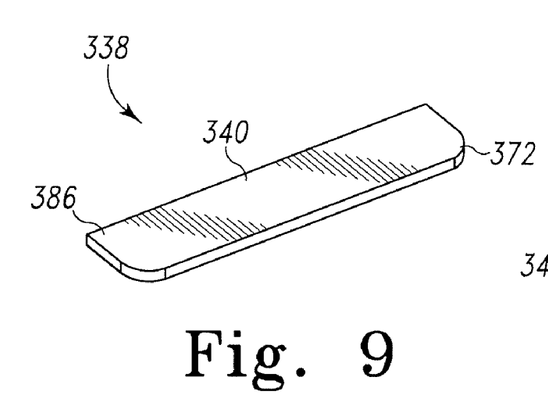
FIG. 9 is an enlarged perspective view of a portion of a latching configuration of a power tool according to another alternative embodiment of the present invention and with the connecting configuration in a locked position.
Figure 10:
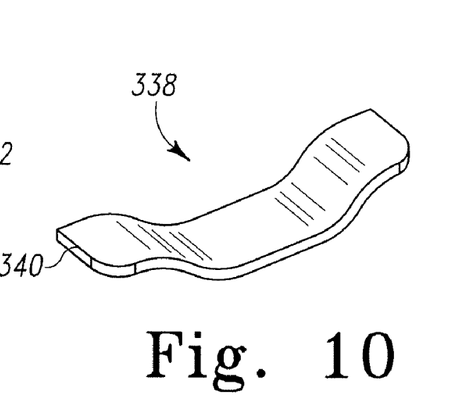
FIG. 10 is an enlarged perspective view of the portion of the latching configuration shown in FIG. 9 in an unlocked position.

FIGS. 9 and 10 illustrate another embodiment of a latching assembly 338 of a power tool. The latching assembly 338 shown in FIGS. 9 and 10 is similar in many ways to the illustrated embodiments of FIGS. 1-8 described above. Accordingly, with the exception of mutually inconsistent features and elements between the embodiment of FIGS. 9 and 10 and the embodiments of FIGS. 1-8, reference is hereby made to the description above accompanying the embodiments of FIGS. 1-8 for a more complete description of the features and elements (and the alternatives to the features and elements) of the embodiment of FIG. 9. Features and elements in the embodiment of FIGS. 9 and 10 corresponding to features and elements in the embodiments of FIGS. 1-8 are numbered in the 300 series.

The latching assembly 338 can include a locking member 340 supported in a recess defined between the grip halves 22a, 22b of the power tool 12. As shown in FIG. 9, the locking member 340 or a portion of the locking member 340 can be formed from an elastic material such that a left side 386 is engageable in a first recess defined between the first and second handle halves 22a, 22b of the power tool 12, a right side 372 is engageable in a second recess defined between the first and second handle halves 22a, 22b, and a central portion 396 positioned between the left and rights sides 366, 372 is moveable axially along locking axis 246 with the locking member 340. Although not shown, the locking member 340 can include an outwardly extending locking projection, which is engageable with the battery pack 14 to secure the battery pack 14 to the power tool 12.

Although particular embodiments of the present invention have been shown and described, other alternative embodiments will be apparent to those skilled in the art and are within the intended scope of the present invention.

What is claimed is:

1. An electrical combination comprising:
   a power tool including a grip formed by a pair of handle halves, a body, a motor supported by the body, a support portion, and a drive mechanism driven by the motor, the drive mechanism being operable to drive a tool element; and a battery selectively engageable with the support portion of the power tool and electrically connectable with the motor such that the battery selectively supplies power to the motor;

wherein a single latch is positioned on the support portion of the power tool, the latch extending outwardly from a forward-most portion of the support portion for engagement with the battery, the single latch being moveable along a locking axis through a recess within the power tool between a locked position to secure the battery to the power tool and an unlocked position to allow removal of the battery from the support portion of the power tool, and wherein a biasing member is operable to bias the latch toward the locked position, the biasing member being integrally formed with the latch, wherein the support portion further includes an actuator operable to move the latch between the locked position and the unlocked position, the actuator movable in a direction substantially parallel to a connecting plane defined between the pair of handle halves, and wherein the latch is integral to the actuator, and wherein the latch and the actuator are supported in the recess and the recess is defined in an upper surface of the support portion, the recess opening toward the body of the power tool.

2. The electrical combination of claim 1, wherein the drive mechanism is positioned forward of the motor, and further comprising an actuator positioned forwardly on the support portion from a hand grip of the power tool and being operable to move the latch between the locked position and the unlocked position.

3. The electrical combination of claim of 1, wherein the drive mechanism is positioned forward of the motor, and wherein the recess opens through a forward end of the support portion.

4. The electrical combination of claim 1, wherein the actuator is positioned on a central portion of the support portion between projections operable to receive guide rails of the battery.

5. The electrical combination of claim 1, wherein the pair of handle halves provide a grip surface, and wherein the latch is supported between the pair of handle halves.

6. The electrical combination of claim 1, wherein the battery includes a pair of guide rails engageable with the support portion and a locking rib positioned between the guide rails, the guide rails engageable with the support portion along an insertion axis, the insertion axis generally perpendicular to the locking axis, and wherein the latch is engageable with the locking rib of the battery.

7. The electrical combination of claim 5, wherein the biasing member includes a first side engageable in a first recess defined between the pair of handle halves, and a second side opposite to the first side and engageable in a second recess defined between the pair of handle halves.

8. The electrical combination of claim 1, wherein the actuator is operable with a single finger of an operator hand to move the latch between the locked position and unlocked position, and wherein the battery includes a pair of grip surfaces positioned on opposite sides of the battery such that other fingers of the operator hand can grip the pair of grip surfaces while the single finger is operating the actuator.

9. A power tool comprising:
a grip formed by a pair of handle halves, the pair of handle halves defining a connecting plane;
a motor;
a drive mechanism driven by the motor to drive a tool element;
a body supporting the motor and the drive mechanism and having a grip surface and a support portion for receiving a removeable battery, the support portion supporting a single latch for movement relative to the support portion between a locked position to secure the battery to the support portion and an unlocked position to allow removal of the battery from the support portion;
wherein the latch is positioned on a central portion of the support portion between projections operable to receive guide rails of the battery along an insertion axis, the latch being movable along a locking axis through a recess within the power tool, the locking axis being generally perpendicular to the insertion axis; and
an actuator integrally formed with the latch and positioned on the support portion forward of the grip surface of the power tool, the actuator being operable to move the latch between the locked position and the unlocked position, the actuator movable in a direction substantially parallel to the connecting plane defined by the pair of handle halves,
wherein the latch and the actuator are supported in the recess and the recess is defined in an upper surface of the support portion, the recess opening toward the drive mechanism.

10. The power tool of claim 9, wherein the drive mechanism is positioned forward of the motor.

11. The power tool of claim 9, wherein the drive mechanism is positioned forward of the motor, and wherein the recess opens through a forward end of the support portion.

12. The power tool of claim 9, wherein the pair of handle halves together define the grip surface, and wherein the latch is supported between the pair of handle halves.

13. The power tool of claim 12, wherein the biasing member includes a first side engageable in a first recess defined between the pair of handle halves, and a second side opposite to the first side and engageable in a second recess defined between the pair of handle halves.

14. The power tool of claim 9, wherein the actuator is operable with a single finger of an operator hand to move the latch between the locked position and unlocked position, and wherein the battery includes a pair of grip surfaces positioned on opposite sides of the battery such that other fingers of the operator hand can grip the pair of grip surfaces while the single finger is operating the actuator.

15. The power tool of claim 9, wherein the support portion further includes a biasing member operable to bias the latch towards the locked position, and wherein the biasing member is integrally formed with the latch.

16. The power tool of claim 15, wherein the drive mechanism is positioned forward of the motor, and wherein at least a portion of the latch extends outwardly from a forward-most portion of the support portion for engagement with the battery.

* * * * *